(12) United States Patent
Takahashi et al.

(10) Patent No.: US 11,962,229 B2
(45) Date of Patent: Apr. 16, 2024

(54) MOTOR, FAN, AIR CONDITIONER, AND MANUFACTURING METHOD OF MOTOR

(71) Applicant: Mitsubishi Electric Corporation, Tokyo (JP)

(72) Inventors: Ryogo Takahashi, Tokyo (JP); Hiroki Aso, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 440 days.

(21) Appl. No.: 17/434,305

(22) PCT Filed: Mar. 3, 2020

(86) PCT No.: PCT/JP2020/008927
§ 371 (c)(1),
(2) Date: Aug. 26, 2021

(87) PCT Pub. No.: WO2020/179788
PCT Pub. Date: Sep. 10, 2020

(65) Prior Publication Data
US 2022/0166290 A1    May 26, 2022

(30) Foreign Application Priority Data

Mar. 6, 2019 (WO) .................. PCT/JP2019/008839
May 16, 2019 (WO) .................. PCT/JP2019/019428

(51) Int. Cl.
*H02K 9/22* (2006.01)
*H02K 5/08* (2006.01)
(Continued)

(52) U.S. Cl.
CPC ............... *H02K 9/227* (2021.01); *H02K 5/08* (2013.01); *H02K 5/18* (2013.01); *H02K 9/06* (2013.01); *H02K 9/223* (2021.01); *H02K 11/33* (2016.01)

(58) Field of Classification Search
CPC .......... H02K 9/227; H02K 9/22; H02K 11/33; H02K 11/30; H02K 5/08; H02K 5/18; H02K 9/06
(Continued)

(56) References Cited

U.S. PATENT DOCUMENTS

| 6,362,554 B1* | 3/2002 | Neal .................. H02K 5/02 |
| | | 310/43 |
| 2008/0017354 A1* | 1/2008 | Neal .................. H01F 27/10 |
| | | 310/43 |

(Continued)

FOREIGN PATENT DOCUMENTS

| JP | S57-083136 A | 5/1982 |
| JP | 2008-178190 A | 7/2008 |

(Continued)

OTHER PUBLICATIONS

International Search Report of the International Searching Authority dated Jun. 2, 2020 for the corresponding International application No. PCT/JP2020/008927 (and English translation).

*Primary Examiner* — Terrance L Kenerly
(74) *Attorney, Agent, or Firm* — POSZ LAW GROUP, PLC

(57) ABSTRACT

A motor includes a rotor, a stator, a circuit board attached to the stator, a heat dissipation member disposed on a side of the circuit board opposite to the stator, and a resin portion covering the stator, the circuit board, and at least a part of the heat dissipation member.

19 Claims, 14 Drawing Sheets

(51) Int. Cl.
*H02K 5/18* (2006.01)
*H02K 9/06* (2006.01)
*H02K 11/33* (2016.01)

(58) Field of Classification Search
USPC .......................................................... 310/43
See application file for complete search history.

(56) References Cited

U.S. PATENT DOCUMENTS

| | | | |
|---|---|---|---|
| 2011/0133582 A1* | 6/2011 | Bingler | .................. F04D 13/08 |
| | | | 310/71 |
| 2016/0241104 A1 | 8/2016 | Yamamoto et al. | |
| 2020/0021168 A1 | 1/2020 | Aso et al. | |
| 2020/0153298 A1 | 5/2020 | Takahashi et al. | |

FOREIGN PATENT DOCUMENTS

| | | | |
|---|---|---|---|
| JP | 2014-107359 A | 6/2014 |
| WO | 2015/060409 A1 | 4/2015 |
| WO | 2017/168728 A1 | 10/2017 |
| WO | 2018/061111 A1 | 4/2018 |
| WO | 2019/026273 A1 | 2/2019 |

* cited by examiner

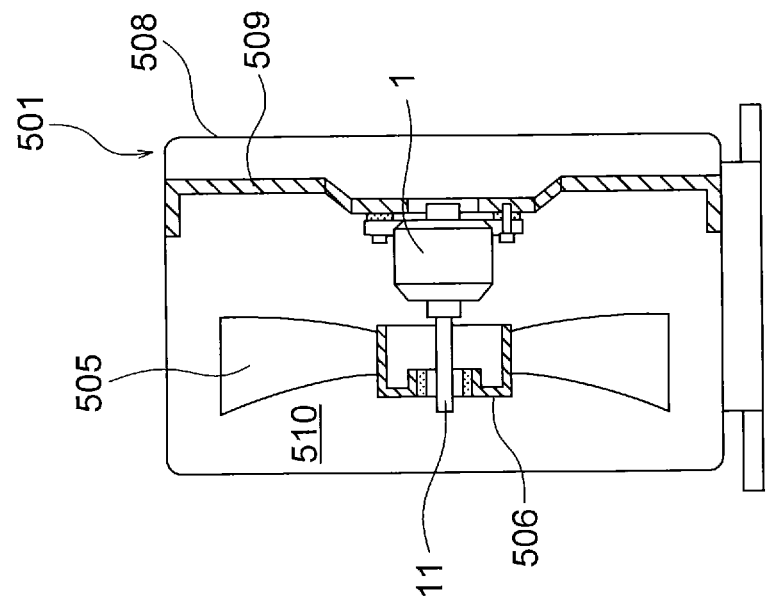
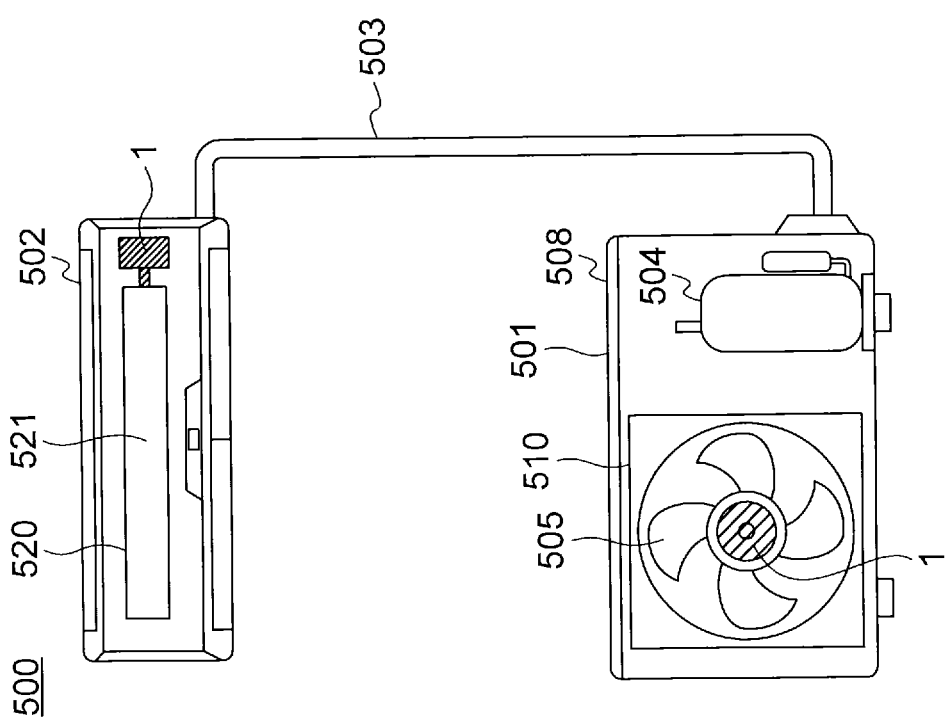

MOTOR, FAN, AIR CONDITIONER, AND MANUFACTURING METHOD OF MOTOR

CROSS REFERENCE TO RELATED APPLICATION

This application is a U.S. national stage application of International Application No. PCT/JP2020/008927 filed on Mar. 3, 2020, which claims priority to International Application No. PCT/JP2019/008839, filed on Mar. 6, 2019 and International Application No. PCT/JP2019/019428 filed on May 16, 2019, the contents of which are incorporated herein by reference.

TECHNICAL FIELD

The present disclosure relates to a motor, a fan, an air conditioner, and a manufacturing method of the motor.

BACKGROUND

A motor includes a heat dissipation member such as a heat sink for releasing heat generated during drive to the outside. The heat dissipation member is fixed to a stator of the motor by press-fitting, screwing, or the like (see, for example, Patent Reference 1).

PATENT REFERENCE

Patent Reference 1

International Publication WO2017/168728 (see FIG. 1)

In a conventional configuration, however, there is a limit to improvement of heat dissipation due to a contact thermal resistance between the motor and the heat dissipation member.

SUMMARY

The present disclosure is intended to solve the above-described problem, and an object of the present disclosure is to improve the heat dissipation of a motor.

A motor of the present disclosure includes a rotor, a stator, a circuit board attached to the stator, a heat dissipation member disposed on a side of the circuit board opposite to the stator, and a resin portion covering the stator, the circuit board, and at least a part of the heat dissipation member. The heat dissipation member has a first positioning portion having a hole or a concave portion. The resin portion has a second positioning portion having a hole or a concave portion, at a position that overlaps with the first positioning portion in a direction of a rotation axis of the rotor.

Effects of the Invention

According to the present disclosure, heat generated in the stator or the circuit board can be released via the resin portion and the heat dissipation member, thereby improving the heat dissipation of the motor.

BRIEF DESCRIPTION OF THE DRAWINGS

FIG. 15(A) is a diagram illustrating an air conditioner to which the motor of each embodiment is applicable, and FIG. 15(B) is a sectional view illustrating an outdoor unit.

DETAILED DESCRIPTION

Hereinafter, embodiments will be described in detail with reference to the drawings. The present disclosure is not limited to these embodiments.

First Embodiment (Configuration of Motor 1)

Figure 1:
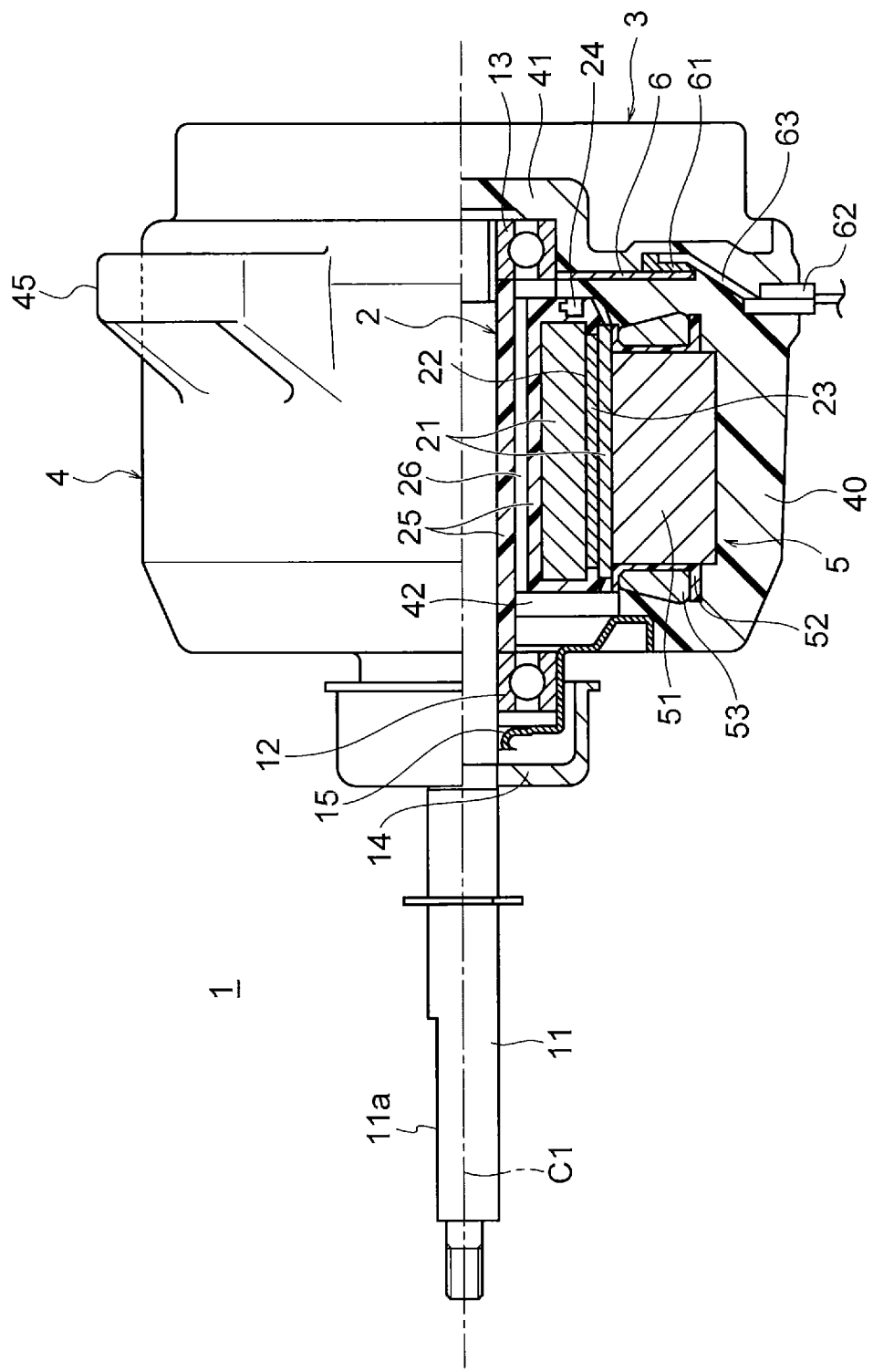
FIG. 1 is a partial sectional view illustrating a motor of a first embodiment.

FIG. 1 is a partial sectional view illustrating a motor 1 of a first embodiment. The motor 1 is a brushless DC motor which is used in, for example, a fan of an air conditioner and driven by an inverter.

The motor 1 includes a rotor 2 having a shaft 11, and a mold stator 4. The mold stator 4 includes a stator 5 having an annular shape and surrounding the rotor 2, a circuit board 6, a heat dissipation member 3, and a mold resin portion 40 serving as a resin portion covering these components. The shaft 11 serves as a rotation shaft of the rotor 2.

In the description below, a direction of the axis C1, which is a center axis of the shaft 11, is referred to as an "axial direction". A circumferential direction (denoted with arrow R1 in FIG. 2 and the like) about the axis C1 of the shaft 11 is referred to as a "circumferential direction". A radial direction about the axis C1 of the shaft 11 is referred to as a "radial direction".

The shaft 11 protrudes from the mold stator 4 to the left side in FIG. 1. A blade 505 (FIG. 15(A)) of a fan, for example, is attached to an attachment portion 11a formed at a protruding portion of the shaft 11. Therefore, the protruding side (the left side in FIG. 1) of the shaft 11 is referred to as a "load side", while the opposite side (the right side in FIG. 1) of the shaft 11 is referred to as a "counter-load side".

(Configuration of Rotor 2)

Figure 2:
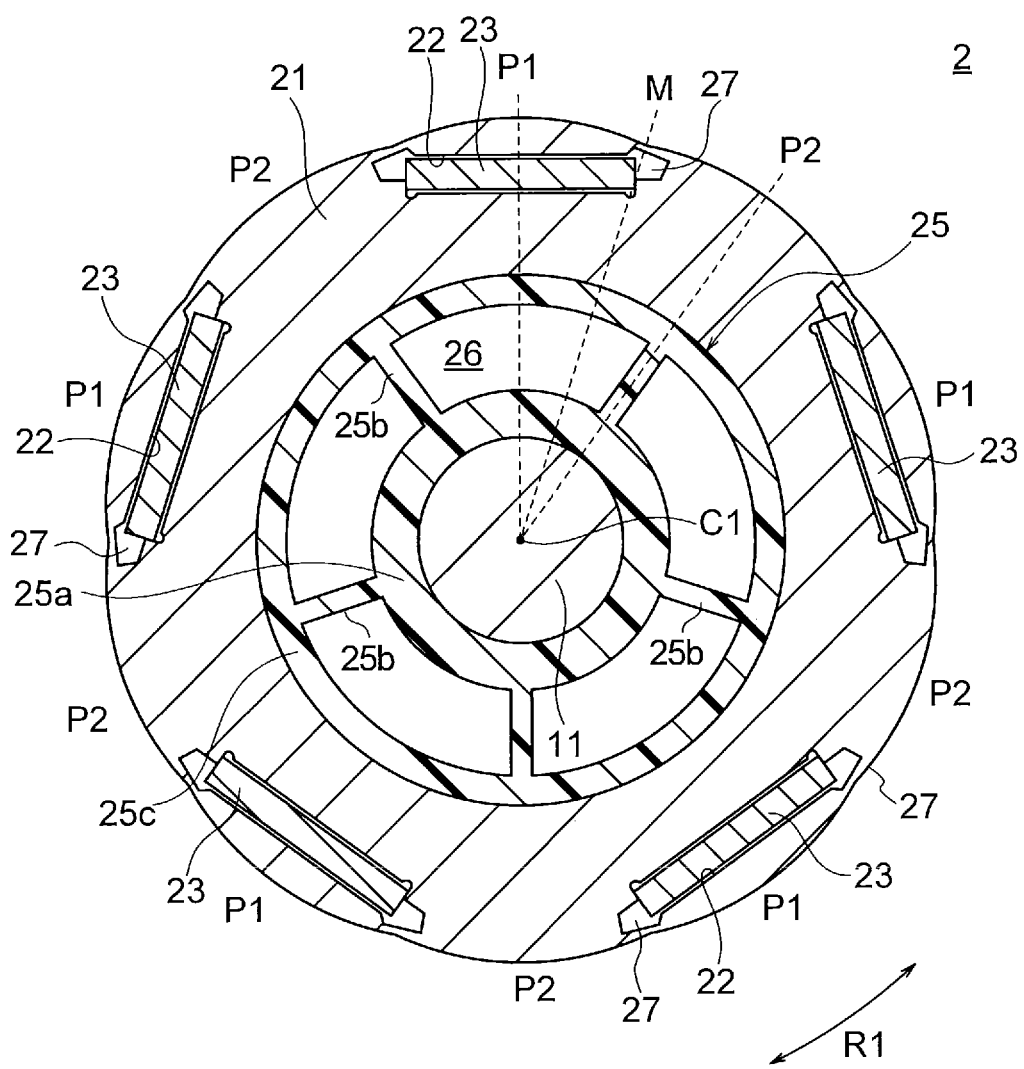
FIG. 2 is a sectional view illustrating a rotor of the motor of the first embodiment.

FIG. 2 is a sectional view illustrating the rotor 2. As illustrated in FIG. 2, the rotor 2 includes the shaft 11, a rotor core 21 disposed on an outer side of the shaft 11 in the radial direction, a plurality of magnets 23 embedded in the rotor core 21, and a resin portion 25 provided between the shaft 11 and the rotor core 21.

The rotor core 21 is a member having an annular shape about the axis C1 and is provided on the outer side of the shaft 11 in the radial direction. The rotor core 21 is famed of a plurality of stacking elements that are stacked in the axial direction and fixed together in the axial direction by crimping, welding, or bonding. The stacking elements are, for example, electromagnetic steel sheets. Each of the stacking elements has a thickness of 0.1 mm to 0.7 mm.

The rotor core 21 has a plurality of magnet insertion holes 22. The magnet insertion holes 22 are disposed at equal intervals in the circumferential direction. The magnet insertion holes 22 are disposed at equal distances from the axis C1. The number of magnet insertion holes 22 is five in this example.

The magnet insertion hole 22 extends linearly in a direction perpendicular to a straight line extending in the radial direction and passing through a center of the magnet insertion hole 22 in the circumferential direction. Meanwhile, the magnet insertion hole 22 may have a V shape whose center in the circumferential direction protrudes on the axis C1 side.

A flux barrier 27, which is an opening, is famed on each of both sides of the magnet insertion hole 22 in the circumferential direction. A thin wall portion is famed between the flux barrier 27 and an outer circumference of the rotor core 21. In order to suppress the leakage magnetic flux between adjacent magnetic poles, the thickness of the thin wall portion is set equal to, for example, the thickness of the electromagnetic steel sheet.

The magnet 23, which is a permanent magnet, is inserted in each magnet insertion hole 22. The magnet 23 is famed of, for example, a rare earth magnet that contains neodymium (Nd), iron (Fe) and boron (B). The magnet 23 is also referred to as a main magnet.

Five magnets 23 have the same magnetic poles on the outer sides in the radial direction. In the rotor core 21, a magnetic pole opposite to those of the magnets 23 is famed in each region between the magnets 23 adjacent in the circumferential direction.

Therefore, five magnet magnetic poles P1 famed by the magnets 23 and five virtual magnetic poles P2 famed by portions of the rotor core 21 are arranged alternately in the circumferential direction in the rotor 2. Such a rotor 2 is referred to as a consequent-pole rotor.

Hereinafter, when the term "magnetic pole" is simply used, this means either of the magnet magnetic pole P1 and the virtual magnetic pole P2. The number of magnetic poles of the rotor 2 is ten. The magnetic poles P1 and P2 of the rotor 2 are disposed at equal angular intervals in the circumferential direction. A boundary between the magnet magnetic pole P1 and the virtual magnetic pole P2 is referred to as an "inter-pole portion M".

The outer circumference of the rotor core 21 has a so-called flower circle shape in a cross section perpendicular to the axial direction. In other words, the outer circumference of the rotor core 21 has such a shape that the outer diameter of the rotor core 21 is maximum at the pole center of each of the magnetic poles P1 and P2 and is minimum at the inter-pole portion M, and an arc shape is famed from the pole center to the inter-pole portion M. The outer circumference of the rotor core 21 is not limited to the flower circle shape, but may be a circular shape.

Although the number of magnetic poles of the rotor 2 is ten in this example, it is sufficient that the number of magnetic poles is an even number of four or more. Moreover, although one magnet 23 is disposed in each magnet insertion hole 22 in this example, two or more magnets 23 may be disposed in each magnet insertion hole 22.

A non-magnetic resin portion 25 is provided between the shaft 11 and the rotor core 21. The resin portion 25 holds the shaft 11 and the rotor core 21 in a state where the shaft 11 and the rotor core 21 are separated from each other. The resin portion 25 is desirably made of a thermoplastic resin such as polybutylene terephthalate (PBT).

The resin portion 25 includes an annular inner cylindrical portion 25a fixed to the shaft 11, an annular outer cylindrical portion 25c fixed to an inner circumference of the rotor core 21, and a plurality of ribs 25b connecting the inner cylindrical portion 25a and the outer cylindrical portion 25c. The ribs 25b are disposed at equal intervals in the circumferential direction. The number of ribs 25b is, for example, half the number of magnetic poles, and is five in this example.

The shaft 11 is fixed to the inside of the inner cylindrical portion 25a of the resin portion 25. The ribs 25b are disposed at equal intervals in the circumferential direction and extend radially and outward in the radial direction from the inner cylindrical portion 25a. A cavity 26 is famed each between the ribs 25b adjacent in the circumferential direction. In this example, the number of ribs 25b is half the number of magnetic poles, and the positions of the ribs 25b in the circumferential direction are coincident with the pole centers of the virtual magnetic poles P2. However, the number and arrangement of the ribs 25 are not limited to examples described here.

As illustrated in FIG. 1, a sensor magnet 24 is disposed to face the rotor core 21 in the axial direction. The sensor magnet 24 is held by the resin portion 25. A magnetic field of the sensor magnet 24 is detected by a magnetic sensor mounted on the circuit board 6, and a position of the rotor 2 in the circumferential direction, i.e., a rotational position of the rotor 2 is detected.

(Configuration of Mold Stator 4)

Figure 3:
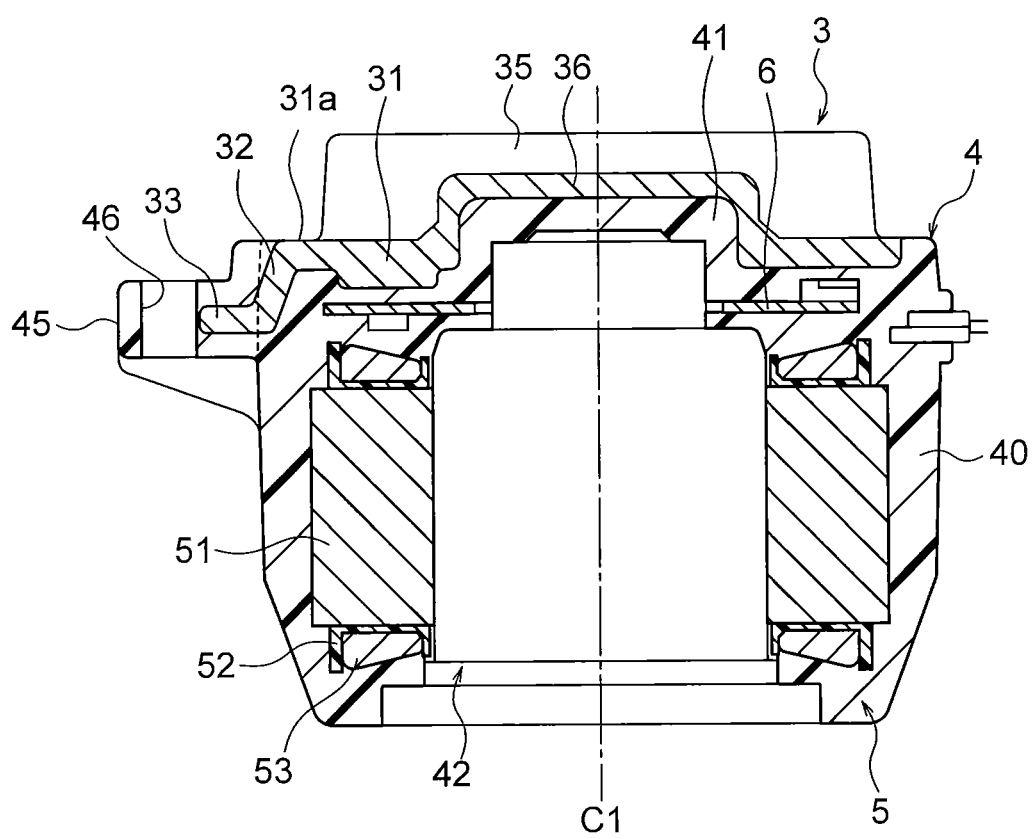
FIG. 3 is a sectional view illustrating a mold stator of the first embodiment.

FIG. 3 is a sectional view illustrating the mold stator 4. As described above, the mold stator 4 includes the stator 5, the circuit board 6, the heat dissipation member 3, and the mold resin portion 40. The stator 5 includes a stator core 51, an insulating portion 52 provided on the stator core 51, and coils 53 wound on the stator core 51 via the insulating portion 52.

The stator core 51 is famed of a plurality of stacking elements that are stacked in the axial direction and integrally fixed by crimping, welding, bonding, or the like. The stacking elements are, for example, electromagnetic steel sheets. Each of the stacking elements has a thickness of 0.1 mm to 0.7 mm.

The mold resin portion 40 is famed of, for example, a thermosetting resin such as a bulk molding compound (BMC). The mold resin portion 40 includes a bearing support 41 on the counter-load side and an opening 42 on the load side. The rotor 2 (FIG. 1) is inserted through the opening 42 into a hollow portion inside the mold stator 4.

As shown in FIG. 1, a metal bracket 15 is attached to the opening 42 of the mold resin portion 40. One bearing 12 that supports the shaft 11 is held by the bracket 15. A cap 14 for preventing invasion of water or the like is attached to the outside of the bracket 15. The bearing support 41 of the mold resin portion 40 has an inner circumferential surface having a cylindrical shape. The other bearing 13 that supports the shaft 11 is held by the inner circumferential surface of the bearing support 41.

Figure 4A:
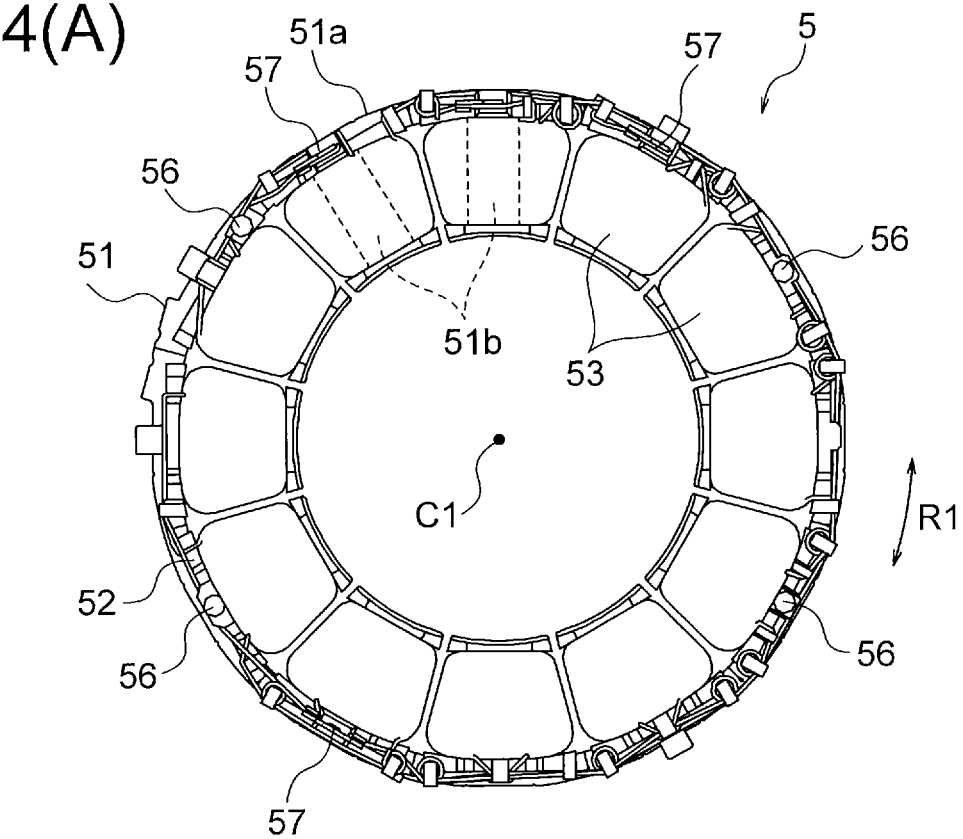
FIGS. 4(A) and 4(B) are respectively a plan view and a side view illustrating a stator of the first embodiment.
Figure 4B:
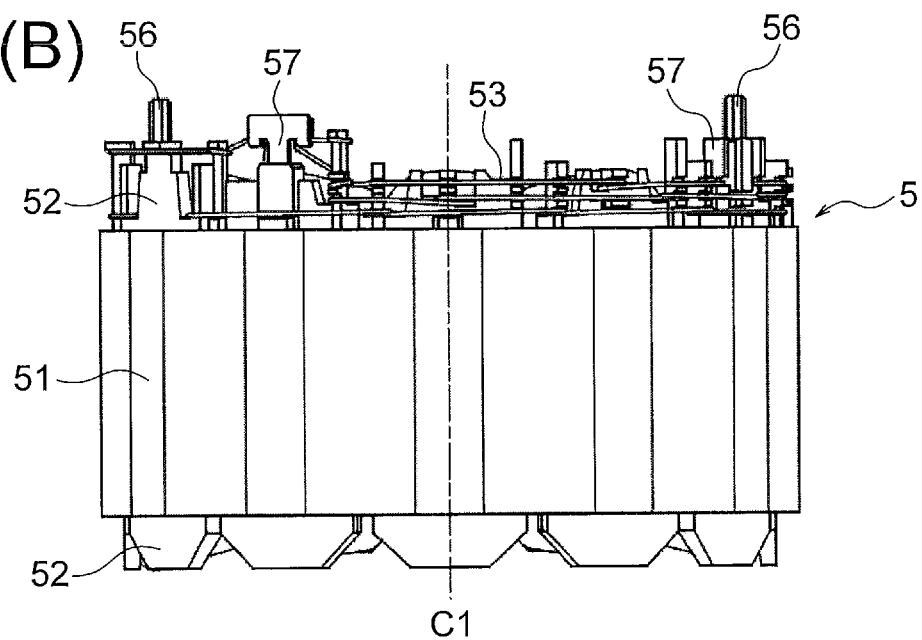

FIG. 4(A) is a plan view illustrating the stator 5. FIG. 4(B) is a side view illustrating the stator 5. The stator core 51 has a yoke 51a having an annular shape about the axis C1 and a plurality of teeth 51b extending inward in the radial direction from the yoke 51a. The number of teeth 51b is 12 in this example, but is not limited to 12. In FIG. 4(A), two of the teeth 51b are indicated by dashed lines.

The coil 53 is, for example, a magnet wire wound around the tooth 51b via the insulating portion 52. The insulating portion 52 is famed of, for example, a thermoplastic resin such as polybutylene terephthalate (PBT). The insulating portion 52 is famed by molding the thermoplastic resin integrally with the stator core 51 or by assembling a molded body of the thermoplastic resin to the stator core 51.

The insulating portion 52 has walls on both of the inner and outer sides of the coils 53 in the radial direction and guides the coils 53 from both sides in the radial direction. A plurality of terminals 57 are mounted on the insulating portion 52. The ends of the coils 53 are connected to the terminals 57 by, for example, fusing (thermal caulking) or soldering.

The insulating portion 52 is provided with a plurality of protrusions 56 for fixing the circuit board 6. The protrusions 56 are inserted through attachment holes famed on the circuit board 6.

As shown in FIG. 1, the circuit board 6 is disposed on one side with respect to the stator 5 in the axial direction. In this example, the circuit board 6 is disposed on the counter-load side with respect to the stator 5. The circuit board 6 is a printed board on which a driving circuit 61 such as a power transistor for driving the motor 1 is mounted. Lead wires 63 are wired on the circuit board 6. The lead wires 63 of the circuit board 6 are drawn out to the outside of the motor 1 through a lead wire outlet part 62 attached to an outer circumferential portion of the mold resin portion 40.

Figure 5A:
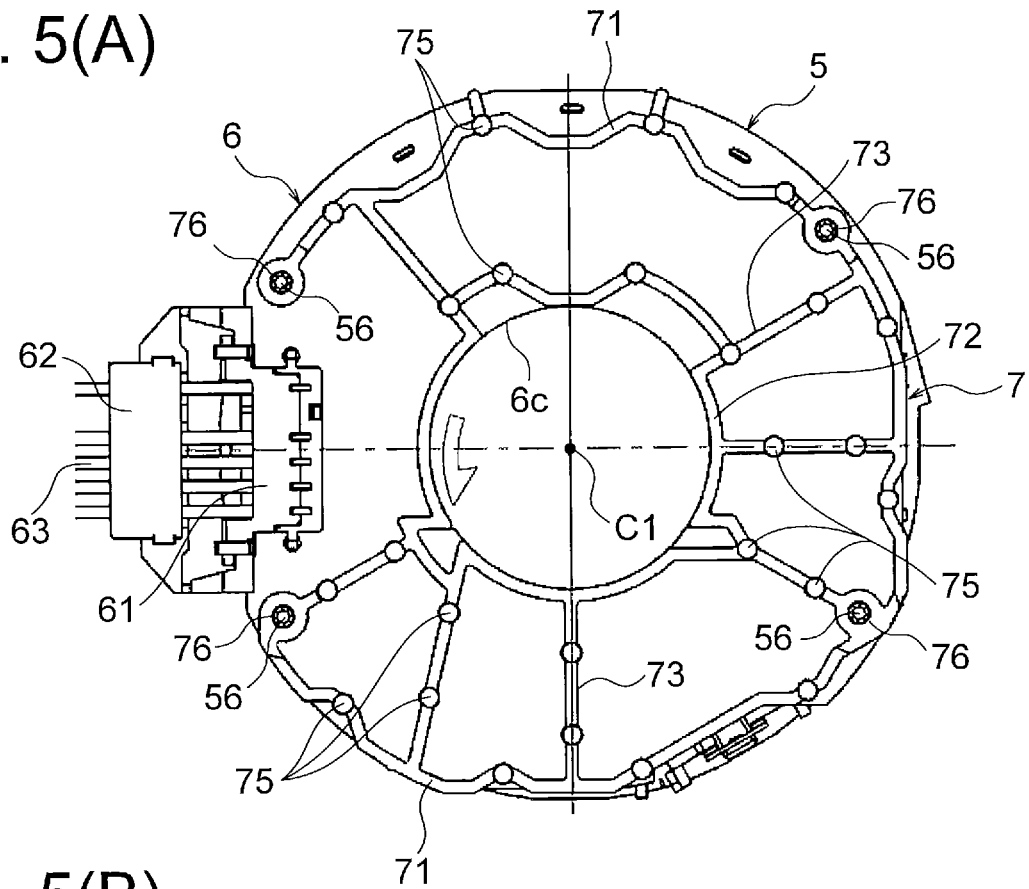
FIGS. 5(A) and 5(B) are respectively a plan view and a side view illustrating the stator, a circuit board, and a board holding member of the first embodiment.
Figure 5B:
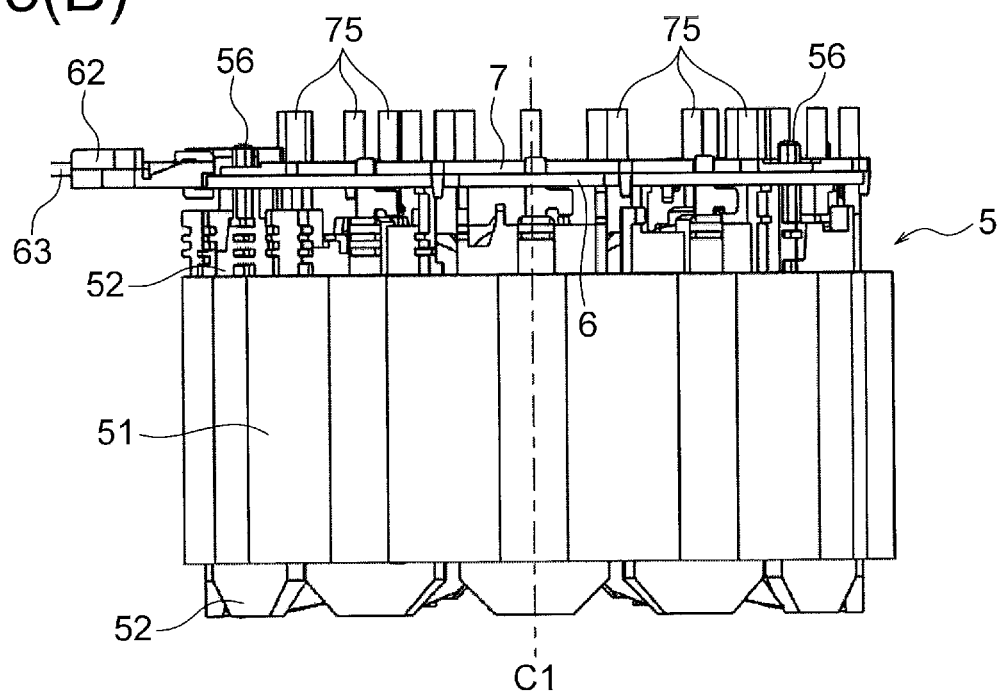

FIG. 5(A) is a plan view illustrating the stator 5, the circuit board 6, and a board holding member 7. FIG. 5(B) is a side view illustrating the stator 5, the circuit board 6, and the board holding member 7. The circuit board 6 is disposed so that its surface is perpendicular to the axial direction. An opening 6c for securing a space to accommodate the bearing 13 (FIG. 1) is famed at a center of the circuit board 6 in the radial direction. The above-described lead wire outlet part 62 is attached to an outer circumferential portion of the circuit board 6.

The board holding member 7 as a support member is provided on the side of the circuit board 6 opposite to the stator 5. The board holding member 7 is provided to suppress defamation of the circuit board 6 during molding. The board holding member 7 is made of, for example, a resin such as PBT.

The board holding member 7 is famed in a framework structure, and includes a rib 71 extending along an outer circumference of the circuit board 6, a rib 72 extending along the opening 6c of the circuit board 6, and ribs 73 connecting these ribs 71 and 72. The shape of the board holding member 7 is not limited to such a shape.

The board holding member 7 has attachment holes 76 through which the protrusions 56 of the insulating portion 52 are inserted. The protrusions 56 protrude through the attachment holes 76 in the axial direction. By thermally or ultrasonically welding the protruding tips of the protrusions 56, the circuit board 6 and the board holding member 7 are fixed to the stator 5.

The board holding member 7 has a plurality of convex portions 75 that protrude on the opposite side to the stator 5. The convex portions 75 are famed on the ribs 71, 72, and 73. The convex portions 75 are disposed dispersedly on the entire board holding member 7. The convex portions 75 serve as support portions that support the heat dissipation member 3.

Figure 6:
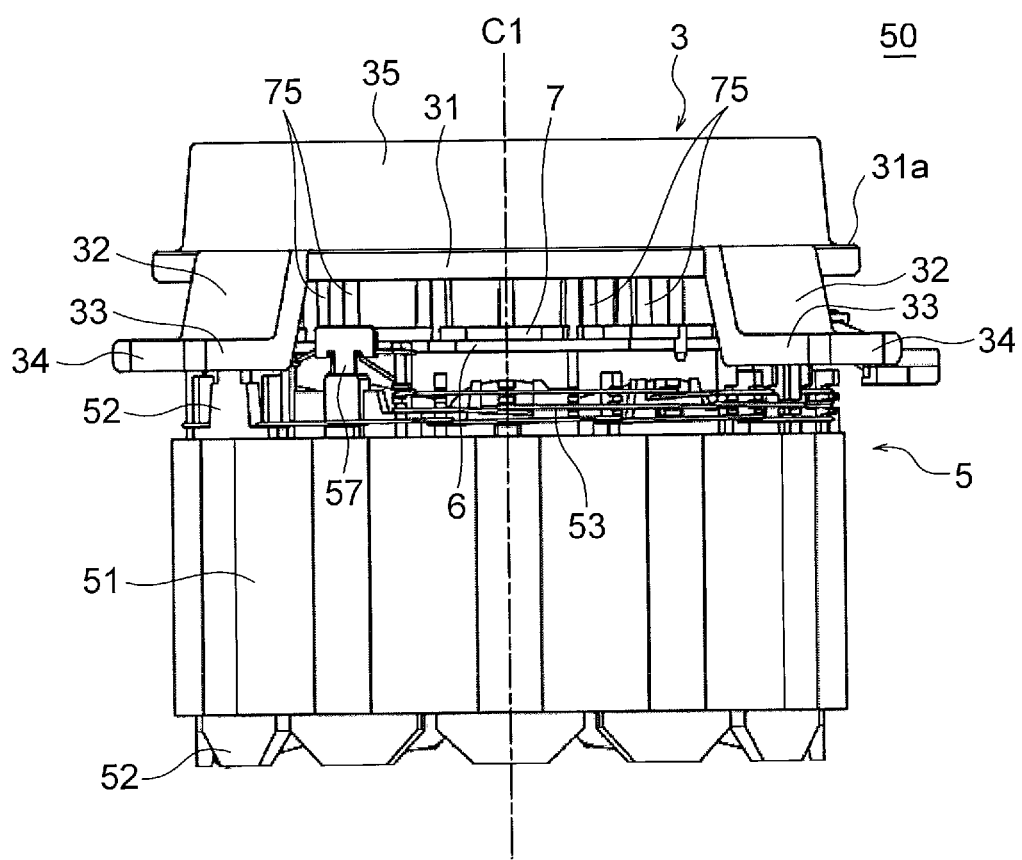
FIG. 6 is a side view illustrating the stator, the circuit board, the board holding member, and a heat dissipation member of the first embodiment.

FIG. 6 is a side view illustrating the stator 5, the circuit board 6, the board holding member 7, and the heat dissipation member 3. The heat dissipation member 3 is supported by the convex portions 75 of the board holding member 7. The heat dissipation member 3 is a heat sink and is made of, for example, a metal such as aluminum.

The heat dissipation member 3 includes a support plate 31, leg portions 32, and fins 35. The support plate 31 is a plate portion supported by the convex portions 75 of the board holding member 7. A surface of the support plate 31 is perpendicular to the axial direction. The leg portions 32 extend outward in the radial direction from an outer circumference of the support plate 31. The fins 35 are famed on the side of the support plate 31 opposite to the stator 5.

As shown in FIG. 3, the stator 5, the circuit board 6, the board holding member 7, and a part of the heat dissipation member 3 are covered with the mold resin portion 40 and constitute the mold stator 4. Meanwhile, the board holding member 7 is not illustrated in FIG. 3.

Portions of the heat dissipation member 3, except for an outer circumferential portion of the support plate 31 and the fins 35, are covered with the mold resin portion 40. The outer circumferential portion of the support plate 31 which is exposed from the mold resin portion 40 is referred to as a flange 31a.

On the inner side of the support plate 31 in the radial direction, a cylindrical portion 36 protruding in the direction away from the stator 5 in the axial direction (upward in FIG. 3) is famed so as to accommodate the bearing 13 (FIG. 1) and the bearing support 41.

Of the heat dissipation member 3, the fins 35 and the flange 31a constitute an exposed portion exposed from the mold resin portion 40. Of the heat dissipation member 3, the leg portions 32, the cylindrical portion 36, and the support plate 31 except for the flange 31a constitute a covered portion covered with the mold resin portion 40.

Figure 7A:
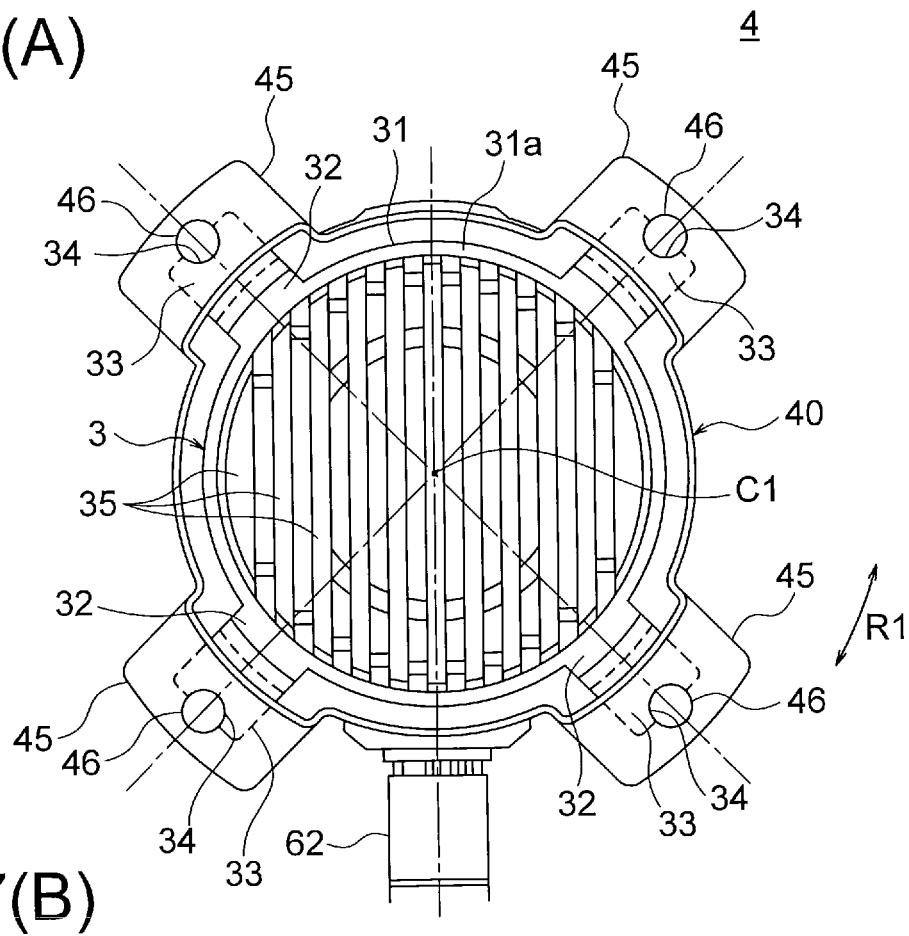
FIGS. 7(A) and 7(B) are respectively a plan view and a side view illustrating the mold stator of the first embodiment.
Figure 7B:
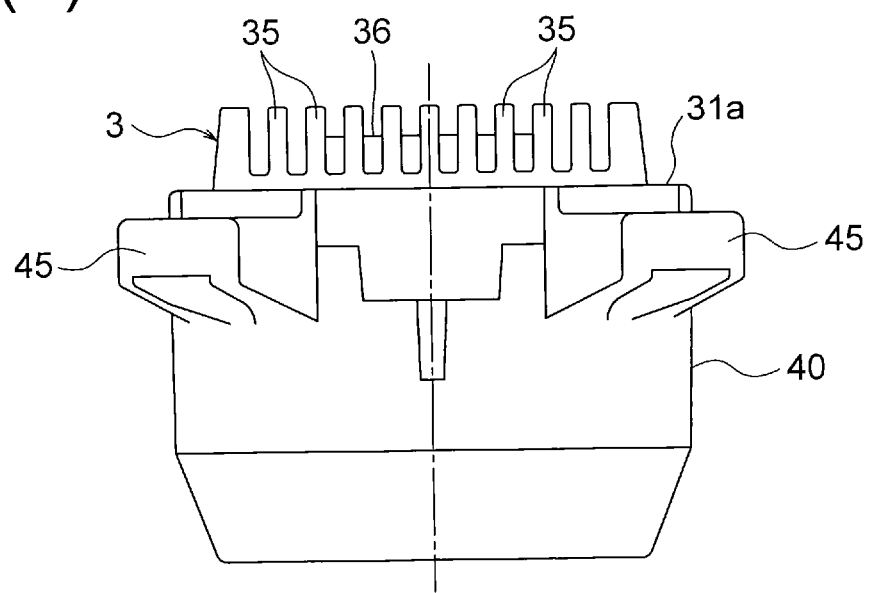

FIGS. 7(A) and 7(B) are respectively a plan view and a side view illustrating the mold stator 4. As illustrated in FIG. 7(A), a plurality of fins 35 of the heat dissipation member 3 are arranged in a direction perpendicular to the axis C1 (the left-right direction in FIG. 7(A)). Each fin 35 has a length in a direction (the vertical direction in FIG. 7(A)) perpendicular to the arrangement direction and has a height in the axial direction.

The flange 31a, which is a part of the support plate 31, extends in an annular shape so as to surround the fins 35 from the outer side in the radial direction.

The leg portions 32 extend outward in the radial direction from the support plate 31. The leg portions 32 are famed at equal intervals about the axis C1. In this example, four leg portions 32 are famed at intervals of 90 degrees about the axis C1. The number of leg portions 32 is not limited to four, and only needs to be one or more.

Tip portions 33 on the outer side of the leg portions 32 in the radial direction extend on a plane perpendicular to the axis C1 as shown in FIG. 6, and are covered with the mold resin portion 40. Concave portions 34, each of which serves as a first positioning portion, are formed at the tip portions 33 of the leg portions 32. The concave portions 34 are portions which engage with positioning pins 209 (FIG. 8) of a mold during molding.

An inner circumferential surface of each concave portion 34 is a surface parallel to the axial direction. The inner circumferential surface of the concave portion 34 contacts the positioning pin 209, so that the position of the heat dissipation member 3 in the circumferential direction is determined. The concave portions 34 are also used as insertion holes through which screws for fixing the motor 1 are inserted.

Each concave portion 34 has a semicircular shape that is opened outward in the radial direction in this example. However, the shape of the concave portion 34 is not limited to such a semicircular shape. Instead of the concave portion 34, a hole may be formed.

The mold resin portion 40 covers the stator 5, the circuit board 6, the board holding member 7, and the heat dissipation member 3 so that only the fins 35 and the flange 31a of the heat dissipation member 3 are exposed. The mold resin portion 40 has attachment legs 45 at positions corresponding to the leg portions 32 of the heat dissipation member 3. In this example, four attachment legs 45 are foiled at intervals of 90 degrees about the axis C1. The number of attachment legs 45 is not limited to four and only needs to be one or more.

Holes 46, each of which serves as a second positioning portion, are famed in the attachment legs 45. Each hole 46 is famed in a position that overlaps with the concave portion 34 of the heat dissipation member 3 in the axial direction. The holes 46 are famed because the resin does not flow into areas where the positioning pins of the mold are located during molding. The holes 46 are also used as insertion holes into which screws for fixing the motor 1 are inserted.

Each hole 46 has a circular shape in this example. However, the shape of the hole 46 is not limited to a circular shape. Instead of the hole 46, a concave portion may be famed.

(Manufacturing Method of Motor 1)

Figure 8:
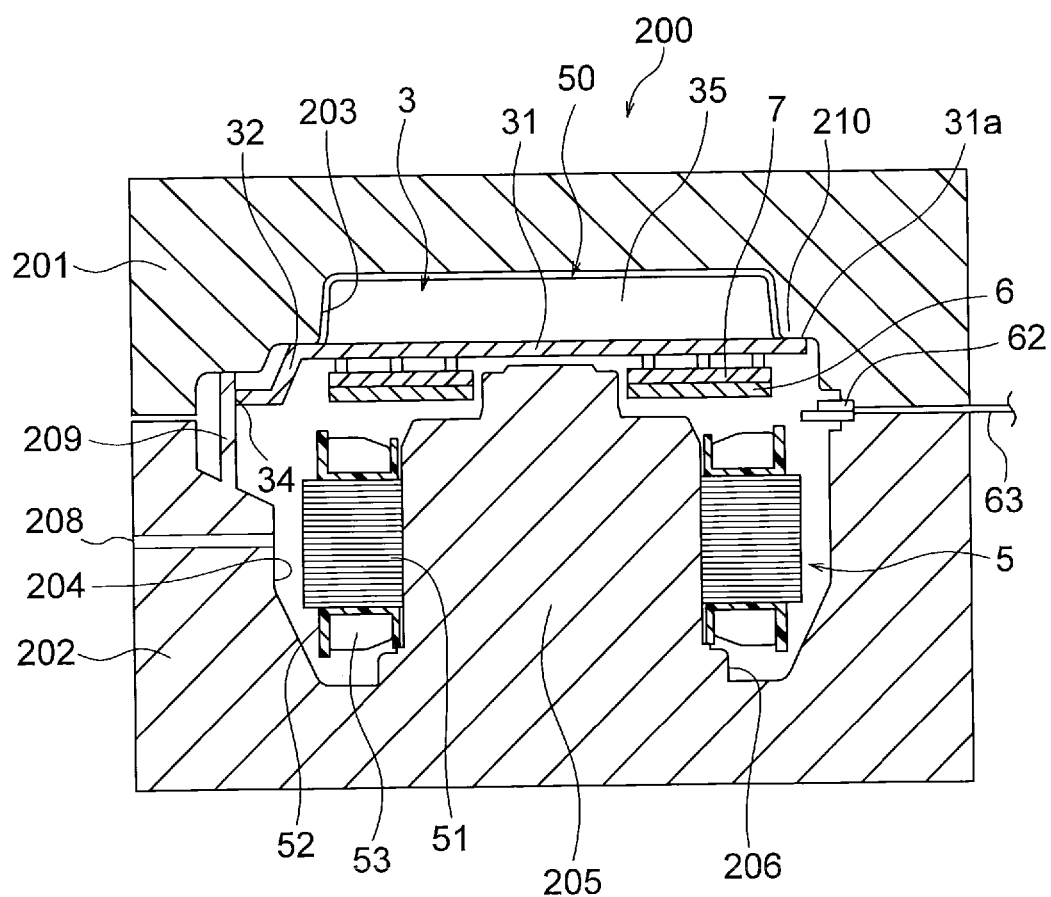
FIG. 8 is a sectional view illustrating a mold used in a manufacturing process of the motor of the first embodiment.

Next, a manufacturing process of the motor 1 will be described. FIG. 8 is a sectional view illustrating a mold 200 used in the manufacturing process of the motor 1. The mold 200 has an upper mold 201 and a lower mold 202 that can be opened and closed, and a cavity 204 is famed between the molds 201 and 202. A gate 208 is famed in the lower mold 202. The gate 208 is a flow path through which the resin is injected into the cavity 204.

A heat-dissipation-member accommodating portion 203 is famed in the upper mold 201. The heat-dissipation-member accommodating portion 203 accommodates the heat dissipation member 3. Further, a contact surface 210 is famed on the upper mold 201. The contact surface 210 is brought into contact with the flange 31a of the heat dissipation member 3. By bringing the contact surface 210 of the upper mold 201 into contact with the flange 31a of the heat dissipation member 3, the resin is prevented from flowing into the surroundings of the fins 35 of the heat dissipation member 3.

A columnar core 205 is famed in the lower mold 202, and the core 205 protrudes within the cavity 204. The core 205 is a portion that engages with the inner side of the stator core 51. A larger-diameter portion 206 is famed on the lower end of the core 205, and protrudes outward in the radial direction from the core 205. The larger-diameter portion 206 is a portion corresponding to the opening 42 (FIG. 3) of the mold stator 4.

The lower mold 202 is provided with the positioning pins 209 as positioning members that engage with the concave portions 34 of the heat dissipation member 3. The positioning pins 209 extend in the axial direction in the cavity 204.

Figure 9:
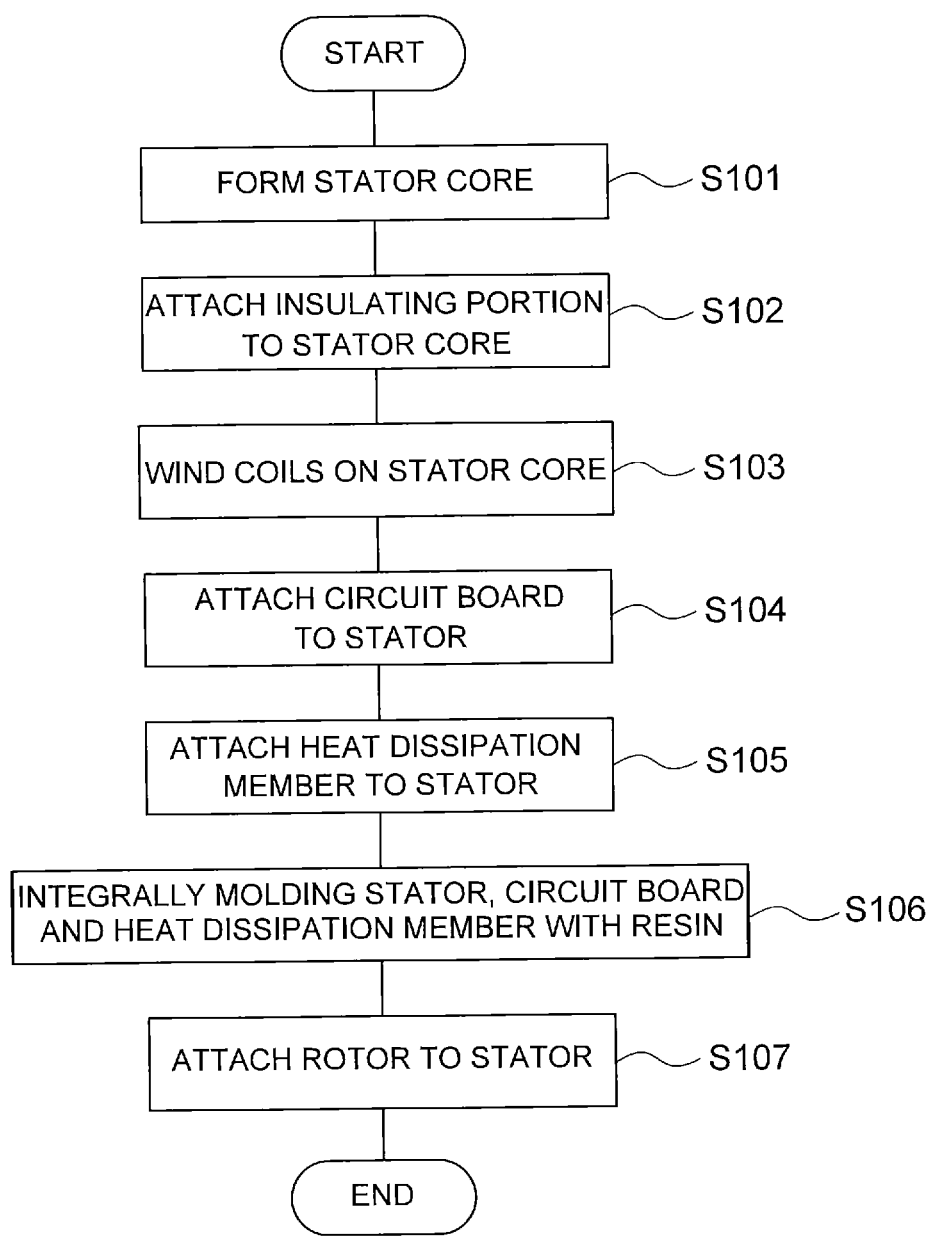
FIG. 9 is a flowchart illustrating a manufacturing process of the motor of the first embodiment.

FIG. 9 is a flowchart illustrating the manufacturing process of the motor 1. First, a plurality of stacking elements are stacked in the axial direction and integrally fixed by crimping or the like, thereby forming the stator core 51 (step S101). Then, the insulating portion 52 is attached to or molded integrally with the stator core 51 (step S102). Furthermore, the coils 53 are wound on the stator core 51 via the insulating portion 52 (step S103). In this way, the stator 5 is famed.

Then, the circuit board 6 and the board holding member 7 are attached to the stator 5 (step S104). At this time, the protrusions 56 (FIG. 5(B)) of the insulating portion 52 of the stator 5 are inserted through the attachment holes of the circuit board 6 and the attachment holes 76 of the board holding member 7. Then, the tips of the protrusions 56 are welded thermally or the like so that the circuit board 6 and the board holding member 7 are fixed to the stator 5.

Then, the heat dissipation member 3 is attached to the board holding member 7 of the stator 5 (step S105). The heat dissipation member 3 is placed on the convex portions 75 of the board holding member 7 and is supported thereon. Thus, a stator assembly 50 (FIG. 6) including the stator 5, the circuit board 6, the board holding member 7, and the heat dissipation member 3 is obtained.

Next, the stator assembly 50 is placed in the mold 200, and molding is performed (step S106).

Specifically, first, the upper mold 201 of the mold 200 is moved upward to open the cavity 204, and the stator assembly 50 is then placed in the cavity 204. At this time, the positioning pins 209 of the mold 200 are engaged with the concave portions 34 of the heat dissipation member 3, thereby positioning the stator assembly 50 in the cavity 204.

Since the plurality of concave portions 34 of the heat dissipation member 3 are famed at equal intervals in the circumferential direction, the position of the stator assembly 50 in the circumferential direction can be changed to a plurality of positions in the cavity 204. A part of the lead wire outlet part 62 and part of the lead wires 63 are protruded to the outside of the cavity 204.

After the stator assembly 50 is placed in the cavity 204, the upper mold 201 is moved downward to close the cavity 204, and then mold resin in a molten state is injected into the cavity 204 through the gate 208. The mold resin injected into the cavity 204 covers the stator assembly 50.

In the case where a thermosetting resin is used as the mold resin, the mold resin is injected into the cavity 204, and then the mold 200 is heated so that the mold resin in the cavity 204 is hardened. In this way, the mold stator 4 in which the stator assembly 50 is covered with the mold resin portion 40 is famed.

Meanwhile, the resin does not flow into portions where the positioning pins 209 are located, and thus the holes 46 are formed in the mold resin portion 40 of the mold stator 4. The holes 46 of the mold resin portion 40 and the concave portions 34 of the heat dissipation member 3 overlap each other in the axial direction.

Aside from steps S101 to S106, the rotor 2 is famed. That is, a plurality of stacking elements are stacked in the axial direction and integrally fixed by crimping or the like, thereby forming the rotor core 21. Then, the magnets 23 are inserted into the magnet insertion holes 22. Furthermore, the shaft 11, the rotor core 21, the magnets 23, and the sensor magnet 24 are molded integrally with resin which is to be the resin portion 25. In this way, the rotor 2 is famed.

Thereafter, the bearings 12 and 13 are attached to the shaft 11 of the rotor 2, and the rotor 2 is inserted into the inside of the stator 5 through the opening 42 of the mold stator 4 (step S107). Further, the bracket 15 is attached to the opening 42 of the mold stator 4, and the cap 14 is attached to the outside of the bracket 15. Consequently, the motor 1 is completed.

(Function)

The heat dissipation member 3 has a function to efficiently release heat generated by the driving circuit 61 of the circuit board 6 and the coils 53, to the outside of the motor 1, thereby suppressing the temperature rise of the motor 1. Since the heat dissipation member 3 is covered with the mold resin portion 40, the contact thermal resistance between the mold resin portion 40 and the heat dissipation member 3 can be reduced, as compared to the case where the heat dissipation member 3 is attached to the mold stator 4 from the outside. Thus, the heat dissipation can be enhanced.

In the case where the heat dissipation member 3 is formed of an aluminum die casting product, the surface of the heat dissipation member 3 tends to have a large unevenness. Thus, when the heat dissipation member 3 is attached to the mold stator 4 from the outside, hollow portions may be famed between the mold resin portion 40 and the heat dissipation member 3, which leads to reduction in heat dissipation. Although the unevenness of the surface of the heat dissipation member 3 can be reduced by polishing, the number of steps increases.

In this embodiment, the mold resin portion 40 is provided to cover the heat dissipation member 3, and thus the resin fills in uneven portions of the surface of the heat dissipation member 3. Thus, hollow portions are less likely to be famed between the mold resin portion 40 and the heat dissipation member 3, and the heat dissipation can be improved.

Even in the case where the mold resin portion 40 is provided to completely cover the heat dissipation member 3, heat dissipation effect can be obtained to some extent. However, by forming the mold resin portion 40 so as to expose the fins 35 of the heat dissipation member 3 to the outside, heat is effectively released from the fins 35 to the outside, so that the heat dissipation effect can be further enhanced.

Since the heat dissipation member 3 has the flange 31a on the outer circumferential side of the fins 35, the molding is performed in a state where the flange 31a is held by the contact surface 210 of the mold 200, so that a configuration in which the fins 35 are exposed to the outside from the mold resin portion 40 can be obtained.

In the case where the heat dissipation member 3 is attached after the molding of the mold stator 4, it is necessary to perform a process such as screwing or press-fitting for fixing the heat dissipation member 3, and thus the number of steps in the manufacturing process increases. In contrast, in the case where the heat dissipation member 3 is molded with resin together with the stator 5 as described above, the heat dissipation member 3 is fixed in the molding step. Thus, it is not necessary to perform further step such as screwing or press-fitting, and thus the number of steps in the manufacturing process can be reduced.

Since the heat dissipation member 3 is supported by the board holding member 7, the height of the heat dissipation member 3, i.e., the distance between the circuit board 6 and the heat dissipation member 3, can be adjusted by adjusting the height of the convex portions 75 of the board holding member 7.

By forming the board holding member 7 of a resin that is more deformable than aluminum forming the heat dissipation member 3, a dimensional error or the like of the heat dissipation member 3 can be absorbed by the defamation of the board holding member 7.

Since the concave portions 34 of the heat dissipation member 3 are disposed at equal intervals in the circumferential direction, the stator assembly 50 can be positioned in the mold 200 by causing the positioning pins 209 of the mold 200 to engage with the concave portions 34.

Furthermore, since the concave portions 34 of the heat dissipation member 3 are famed at positions corresponding to the attachment legs 45 of the mold resin portion 40, the concave portions 34 of the heat dissipation member 3 and the holes 46 of the mold resin portion 40 can also be used as the attachment holes for fixing the motor 1 to a frame of the fan or the like.

The shape of the concave portion 34 of the heat dissipation member 3 and the shape of the hole 46 of the mold resin portion 40 are not limited. It is desirable that the concave portion 34 has a semicircular shape and the hole 46 has a circular shape, in consideration of the shape of the positioning pin 209 of the mold 200 and in consideration that the concave portion 34 and the hole 46 are used as the attachment hole of the motor 1.

Effects of Embodiment

As described above, the motor 1 of the first embodiment includes the rotor 2, the stator 5, the circuit board 6 attached to the stator 5, the heat dissipation member 3 disposed on the side of the circuit board 6 opposite to the stator 5, and the mold resin portion 40 covering the stator 5, the circuit board 6, and at least a part of the heat dissipation member 3. Thus, heat generated in the stator 5 or the circuit board 6 can be released to the outside via the mold resin portion 40 and the heat dissipation member 3. Accordingly, the heat dissipation of the motor 1 can be enhanced.

Since the board holding member 7 supports the heat dissipation member 3, prevention of deformation of the circuit board 6 and supporting of the heat dissipation member 3 during the molding can be achieved by the common member. Also, by adjusting the height of the convex portions 75 of the board holding member 7, the distance between the circuit board 6 and the heat dissipation member 3 can be adjusted.

Since the heat dissipation member 3 has the support plate 31 (except for the flange 31a) covered with the mold resin portion 40 and the fins 35 exposed from the mold resin portion 40, heat generated in the circuit board 6 and the coils 53 can be efficiently transferred to the heat dissipation member 3 and thereby released to the outside from the fins 35.

The flange 31a of the heat dissipation member 3 is exposed from the mold resin portion 40. Thus, in the molding step, the flange 31a is held by the contact surface 210 of the mold 200, so that the fins 35 can be exposed from the mold resin portion 40.

The heat dissipation member 3 has the concave portion 34 as the first positioning portion, and the mold resin portion 40 has the hole 46 as the second positioning portion at the position that overlaps with the concave portion 34 in the axial direction. Thus, the positioning pin 209 of the mold 200 is engaged with the concave portion 34, so that the stator assembly 50 can be positioned in the mold 200.

In particular, since the concave portion 34 has a surface parallel to the axis C1, the stator assembly 50 can be positioned in the mold 200 in the circumferential direction.

The plurality of concave portions 34 are famed at equal intervals in the circumferential direction, and the plurality of holes 46 are famed at equal intervals in the circumferential direction. Thus, the position of the stator assembly 50 in the circumferential direction can be changed to a plurality of positions in the mold 200.

The mold resin portion 40 has the attachment legs 45 and the holes 46 are famed in the attachment legs 45. Thus, the holes 46 famed during the molding step can be used as the attachment holes.

Figure 14:
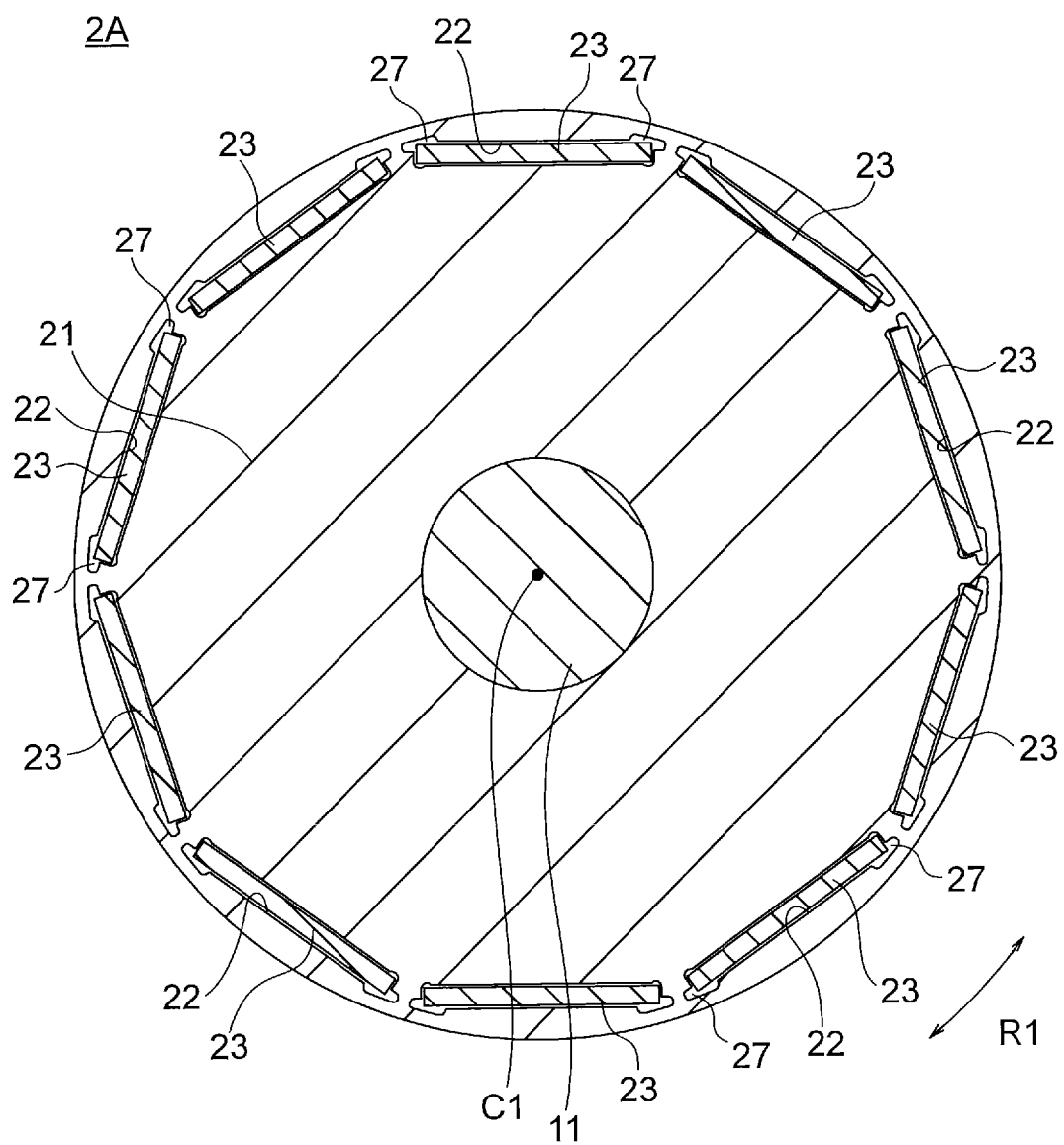
FIG. 14 is a sectional view illustrating a rotor of a motor of a fourth embodiment.

The rotor 2 is of a consequent-pole type, and the number of magnets 23 of the rotor 2 is half the number of magnets of a non-consequent-pole rotor 2A (see FIG. 14). Thus, the size of each magnet 23 made of a rare earth magnet having high magnetic force can be increased. Accordingly, the machining cost can be reduced, and the magnetic force of the magnets 23 can be increased. In other words, the manufacturing cost can be reduced, the output of the motor 1 can be increased, and the size of the motor 1 can be reduced.

As the output of the motor 1 increases, heat generated in the motor 1 also increases, but the heat dissipation member 3 can efficiently dissipate the heat of the motor 1 to the outside, and thus the heating of the motor 1 can be suppressed.

Second Embodiment

Figure 10:
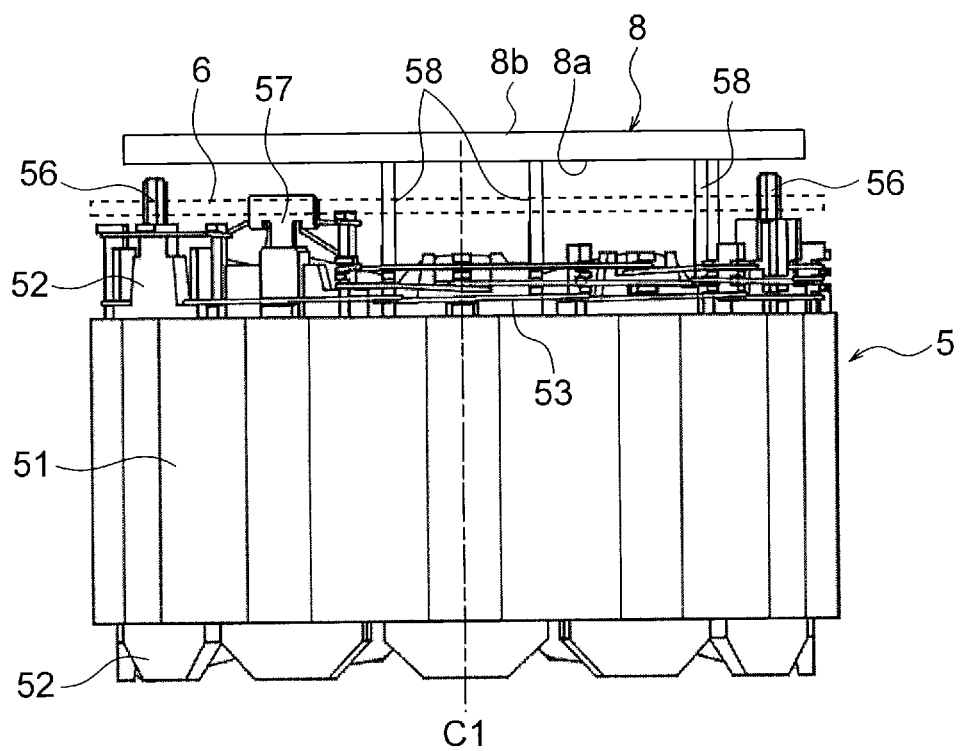
FIG. 10 is a side view illustrating a stator and a heat dissipation member of a motor of a second embodiment.

Next, a second embodiment will be described. FIG. 10 is a side view illustrating a stator 5 and a heat dissipation member 8 of a motor of the second embodiment. The above-described heat dissipation member 3 of the first embodiment is configured as the heat sink that includes the support plate 31, the leg portions 32, the fins 35, and the cylindrical portion 36. In contrast, the heat dissipation member 8 of the second embodiment is configured as a heat dissipation plate as illustrated in FIG. 10.

The above-described heat dissipation member 3 of the first embodiment is supported by the board holding member 7. In contrast, the heat dissipation member 8 of the second embodiment is supported by protrusions 58 provided on the insulating portion 52 of the stator 5.

As illustrated in FIG. 10, the plurality of protrusions 58 that protrude in the axial direction are attached to the insulating portion 52 of the stator 5. The protrusions 58 are in contact with a lower surface 8a of the heat dissipation member 8 on the stator 5 side, and support the heat dissipation member 8. The protrusions 58 are disposed dispersedly at a plurality of positions on a plane perpendicular to the axial direction. The arrangement of the protrusions 58 is not limited as long as the protrusions 58 can support the heat dissipation member 8 in a stable state.

The protrusions 58 may be integrally foiled with the insulating portion 52 made of PBT or may be attached as separate members to the insulating portion 52.

The circuit board 6 described in the first embodiment is indicated by a dashed line in FIG. 10. The protrusions 58 protrude toward the heat dissipation member 8 through the inner circumferential side or outer circumferential side of the circuit board 6. The circuit board 6 may be provided with openings that allow the protrusions 58 to pass.

Figure 11:
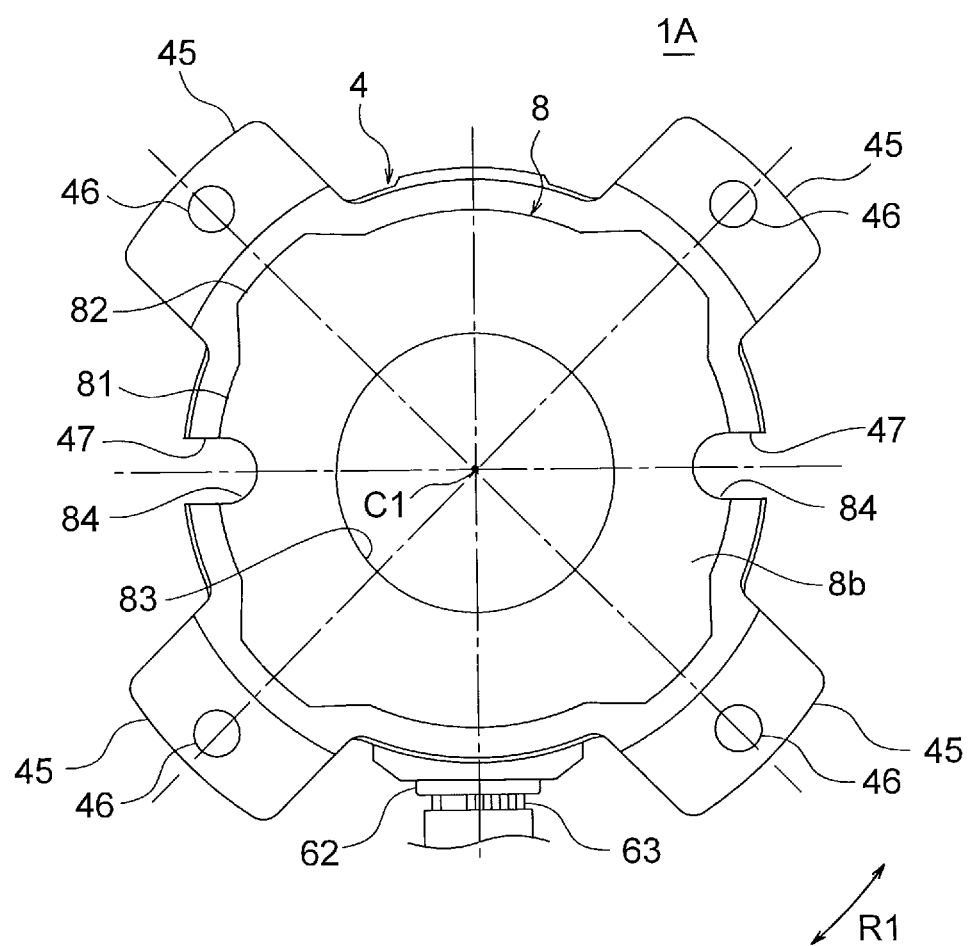
FIG. 11 is a plan view illustrating the motor of the second embodiment.

FIG. 11 is a plan view illustrating the motor 1A of the second embodiment. The heat dissipation member 8 has an opening 83 for securing a space to accommodate the bearing support 41 (FIG. 3) at a center of the heat dissipation member 8 in the radial direction.

Concave portions 84 are famed on an outer circumference 81 of the heat dissipation member 8. The concave portions 84 are portions engaging with the positioning pins of the mold during the molding. An inner circumferential surface of each concave portion 84 is a surface parallel to the axial direction. The inner circumferential surface of the concave portion 84 contacts the positioning pin, so that the position of the heat dissipation member 8 in the circumferential direction is determined.

Each concave portion 84 has a semicircular shape that is opened outward in the radial direction in this example. However, the shape of the concave portion 84 is not limited to such a semicircular shape. Instead of the concave portion 84, a hole may be formed.

A plurality of concave portions 84 of the heat dissipation member 8 are foiled at equal intervals in the circumferential direction. In this example, two concave portions 84 are foiled at intervals of 180 degrees about the axis C1.

The outer circumference 81 of the heat dissipation member 8 illustrated in FIG. 11 has portions 82 corresponding to the attachment legs 45 of the mold resin portion 40, and the portions 82 are shaped to be convex outward in the radial direction. However, the shape of the outer circumference 81 is not limited to such a shape. The outer circumference 81 may have a circular shape.

The mold resin portion 40 has a similar structure to that of the first embodiment, but has concave portions 47 at positions corresponding to the concave portions 84 of the heat dissipation member 8. The concave portions 47 are famed because the resin does not flow into areas where the positioning pins of the mold 200 are located.

The lower surface 8a side of the heat dissipation member 8 is covered with the mold resin portion 40. Thus, heat of the mold resin portion 40 is easily transferred to the heat dissipation member 8. The upper surface 8b of the heat dissipation member 8 is exposed from the mold resin portion 40. Thus, heat is easily released from the heat dissipation member 8 to the outside.

The motor 1A of the second embodiment is configured in the same manner as the motor 1 of the first embodiment except for the above-described points.

As described above, the motor 1A of the second embodiment has the heat dissipation member 8 and the mold resin portion 40 covering at least a part of the heat dissipation member 8. Thus, the heat dissipation can be enhanced as in the motor 1 of the first embodiment. Further, since the heat dissipation member 8 has a plate shape, the configuration of the motor 1 can be simplified, and the manufacturing cost can be reduced.

In addition, since the heat dissipation member 8 is supported by the protrusions 58 of the stator 5, the number of parts can be reduced, and thus the manufacturing cost can be further reduced.

The heat dissipation member 8 of the second embodiment may be supported by the board holding member 7 as described in the first embodiment. The heat dissipation member 3 of the first embodiment may be supported by the protrusions 58 of the stator 5 as described in the second embodiment.

Third Embodiment

Figure 12:
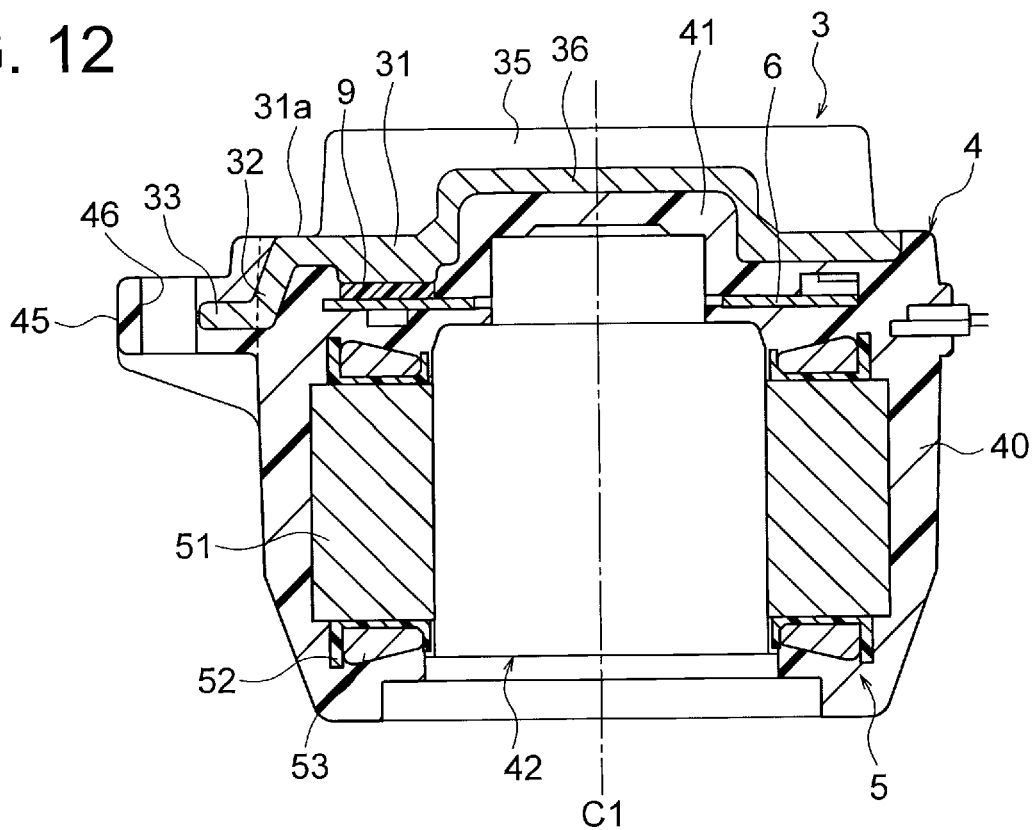
FIG. 12 is a sectional view illustrating a mold stator of a motor of a third embodiment.

Next, a third embodiment will be described. FIG. 12 is a sectional view illustrating a mold stator 4 of a motor of a third embodiment. In the motor of the third embodiment, a heat dissipation sheet 9 is disposed between the heat dissipation member 3 and the circuit board 6. The heat dissipation sheet 9 is made of a resin having a higher thermal conductivity than that of the mold resin portion 40. The heat dissipation sheet 9 is made of, for example, silicone resin.

The heat dissipation sheet 9 is disposed between the support plate 31 of the heat dissipation member 3 and the circuit board 6 in this example. Although not illustrated in FIG. 12, the board holding member 7 (FIG. 5(A)) described in the first embodiment is disposed between the heat dissipation member 3 and the circuit board 6. Since the board holding member 7 has the framework structure in which a plurality of ribs are combined, the heat dissipation sheet 9 can be disposed between the heat dissipation member 3 and the circuit board 6 via a space between the ribs.

Figure 13:
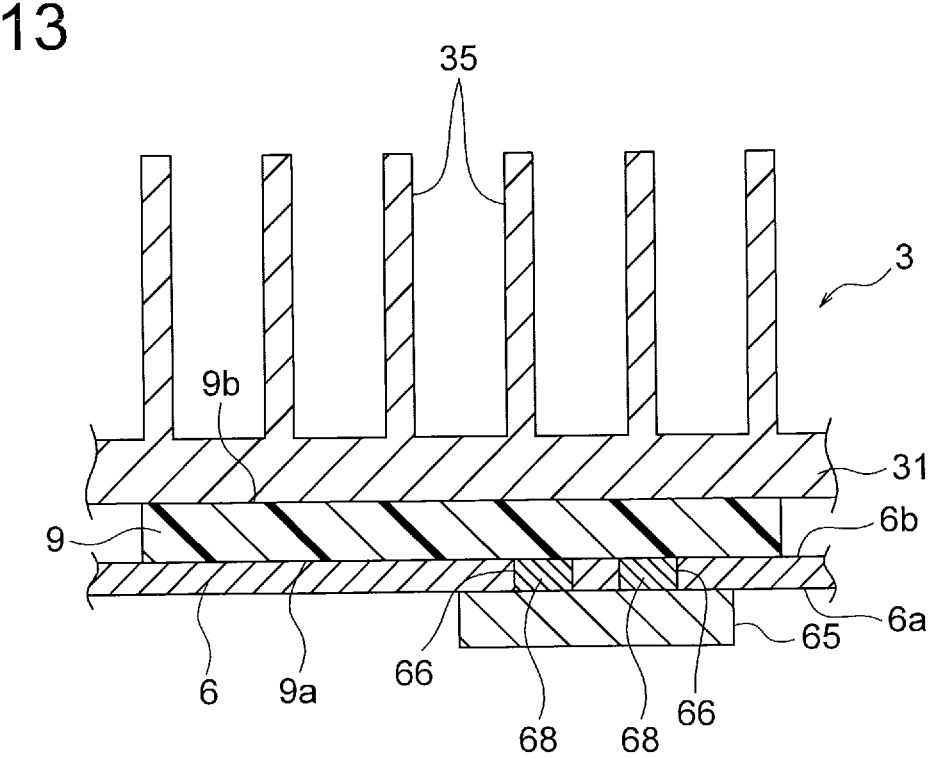
FIG. 13 is an enlarged sectional view illustrating a part of the mold stator of the motor of the third embodiment.

FIG. 13 is an enlarged diagram illustrating a part including the heat dissipation member 3, the heat dissipation sheet 9, and the circuit board 6. The circuit board 6 has a first surface 6a on the stator 5 side and a second surface 6b which is an opposite surface to the first surface 6a. An element 65 such as the driving circuit 61 or the like is mounted on the first surface 6a of the circuit board 6 by soldering.

The heat dissipation sheet 9 has a first surface 9a on the stator 5 side and a second surface 9b which is an opposite surface to the first surface 9a. The first surface 9a of the heat dissipation sheet 9 is in contact with the second surface 6b of the circuit board 6. The second surface 9b of the heat dissipation sheet 9 is in contact with the support plate 31 of the heat dissipation member 3.

In addition, through holes 66 extending from the first surface 6a to the second surface 6b are famed at positions corresponding to the soldering portions of the element 65 on the circuit board 6. Heat conductive members 68 made of copper or the like are disposed in the through holes 66. That is, each of the heat conductive members 68 is in contact with both the element 65 and the heat dissipation sheet 9.

In the manufacturing process of the motor, the heat dissipation sheet 9 is bonded to the heat dissipation member 3. Then, the heat dissipation member 3, the stator 5, the circuit board 6, and the board holding member 7 are placed in the mold 200 (FIG. 8), and then the molding is performed. In this way, the motor in which the heat dissipation sheet 9 is disposed between the heat dissipation member 3 and the circuit board 6 is obtained.

By disposing the heat dissipation sheet 9 between the heat dissipation member 3 and the circuit board 6, heat generated in the circuit board 6 is easily transferred to the heat dissipation member 3 via the heat dissipation sheet 9, and thus the heat dissipation can be further improved.

The heat dissipation sheet 9 is desirably sandwiched between the heat dissipation member 3 and the circuit board 6 and compressed to some extent. Thus, during the molding, the resin does not enter between the heat dissipation sheet 9 and the heat dissipation member 3, and between the heat dissipation sheet 9 and the circuit board 6, Thus, close contact between the heat dissipation sheet 9 and each of the heat dissipation member 3 and the circuit board 6 is obtained.

Since the heat dissipation sheet 9 is molded together with the heat dissipation member 3 and the circuit board 6, low adhesiveness is required for the heat dissipation sheet 9. Thus, choice of material for the heat dissipation sheet 9 can be increased.

Heat generated in the element 65 on the first surface 6a of the circuit board 6 is transferred to the heat dissipation sheet 9 via the heat conductive members 68 which are in contact with the soldering portions of the element 65 and the heat dissipation sheet 9. Thus, the heat generated in the element 65 can be transferred from the heat dissipation sheet 9 to the heat dissipation member 3 and efficiently released from the fins 35 to the outside. Consequently, the heat dissipation can be improved.

In a case where an element is famed on the second surface 6b of the circuit board 6, the element on the circuit board 6 is in contact with the heat dissipation sheet 9, which may cause unevenness on the heat dissipation sheet 9. In such a case, close contact between the heat dissipation sheet 9 and the circuit board 6 may locally be reduced. By forming the element 65 on the first surface 6a of the circuit board 6 and connecting the element 65 to the heat dissipation sheet 9 via the heat conductive members 68 as described above, the close contact between the heat dissipation sheet 9 and the circuit board 6 can be improved, and the heat dissipation can be improved.

The motor 1 of the third embodiment is configured in the same manner as the motor 1 of the first embodiment except for the above-described points.

Since the motor of the third embodiment includes the heat dissipation sheet 9 between the heat dissipation member 3 and the circuit board 6 as described above, heat generated in the circuit board 6 is easily transferred to the heat dissipation member 3 via the heat dissipation sheet 9, and thus the heat dissipation can be improved.

Further, the circuit board 6 has the element 65 on the first surface 6a, and the second surface 6b is in contact with the heat dissipation sheet 9. Furthermore, the circuit board 6 has the heat conductive member 68 that connects the element 65 with the heat dissipation sheet 9. Thus, the close contact between the circuit board 6 and the heat dissipation sheet 9 can be improved, and thus the heat of the element 65 can be efficiently transferred to the heat dissipation sheet 9.

In the motor of the third embodiment, it is also possible to use the plate-shaped heat dissipation member 8 as described in the second embodiment. It is also possible to employ a configuration in which the heat dissipation member 3 is supported by the protrusions 58 of the stator 5 as described in the second embodiment.

Fourth Embodiment

Next, a fourth embodiment will be described. FIG. 14 is a sectional view illustrating a rotor 2A of a fourth embodiment. The rotor 2 (FIG. 2) of the first embodiment described above is of the consequent-pole type having the magnet magnetic poles and the virtual magnetic poles. In contrast, the rotor 2A of the fourth embodiment is of a non-consequent-pole type in which all the magnetic poles are formed of magnet magnetic poles.

The rotor 2A has a rotor core 21 having a cylindrical shape about the axis C1. The rotor core 21 is famed of a plurality of electromagnetic steel sheets which are stacked in the axial direction and fixed together by crimping, welding, or bonding. Each of the electromagnetic steel sheet has a thickness of, for example, 0.1 mm to 0.7 mm. The rotor core 21 has a central hole at its center in the radial direction, and the shaft 11 is fixed to the center hole.

A plurality of magnet insertion holes 22 are disposed in the rotor core 21 at equal intervals in the circumferential direction. The shape of each magnet insertion hole 22 is as described in the first embodiment. The flux barrier 27 is famed on each of both sides of the magnet insertion hole 22 in the circumferential direction. The number of magnet insertion holes 22 is ten in this example, but is not limited to ten.

The magnet 23 is inserted in each magnet insertion hole 22. The material and shape of the magnet 23 are as described in the first embodiment.

The magnets 23 adjacent to each other in the circumferential direction are disposed so that the opposite magnetic poles face the outer circumference side of the rotor core 21. Thus, all the magnetic poles of the rotor 2A are composed of the magnets 23. In this example, the number of magnetic poles of the rotor 2A is ten.

In the non-consequent-pole type rotor 2A, the number of magnets 23 is greater than that of the consequent-pole type rotor 2. However, the non-consequent-pole rotor 2A has an advantage that vibration and noise are less likely to occur.

The motor of the fourth embodiment is configured in the same manner as the motor 1 of the first embodiment except for the above-described points. Even when the non-consequent-pole rotor 2A is used in this way, the effects described in the first to third embodiments can be achieved.

(Air Conditioner)

Next, an air conditioner to which the motor of each of the above-described embodiments is applicable will be described. FIG. 15(A) is a diagram illustrating a configuration of an air conditioner 500 to which the motor 1 of the first embodiment is applied. The air conditioner 500 includes an outdoor unit 501, an indoor unit 502, and a refrigerant pipe 503 that connects these units.

The outdoor unit 501 includes an outdoor fan 510 which is, for example, a propeller fan. The indoor unit 502 includes an indoor fan 520 which is, for example, a cross flow fan. The outdoor fan 510 has the blade 505 and the motor 1 that drives the blade 505. The indoor fan 520 has a blade 521 and the motor 1 that drives the blade 521. The motor 1 has the configuration described in the first embodiment. FIG. 15(A) also illustrates a compressor 504 that compresses refrigerant.

FIG. 15(B) is a sectional view of the outdoor unit 501. The motor 1 is supported by a frame 509 disposed in a housing 508 of the outdoor unit 501. The blade 505 is attached to the shaft 11 of the motor 1 via a hub 506.

In the outdoor fan 510, the rotation of the rotor 2 of the motor 1 rotates the blade 505 to blow air to the outside of a room. During a cooling operation of the air conditioner 500, heat is released when the refrigerant compressed by the compressor 504 is condensed in the condenser. This heat is released to the outside of the room by the outdoor fan 510.

Similarly, in the indoor fan 520 (FIG. 15(A)), the rotation of the rotor 2 of the motor 1 rotates the blade 521 to blow air to the inside of the room. During the cooling operation of the air conditioner 500, the refrigerant removes heat from air as the refrigerant evaporates in an evaporator, and the air is blown into the room by the indoor fan 520.

The motor 1 of the first embodiment described above has high heat dissipation and is low in cost. Therefore, by using the motor 1 as driving sources of the air conditioner 500, the reliability of the air conditioner 500 can be improved and the manufacturing cost of the air conditioner 500 can be reduced.

As the motor 1, it is also possible to use the motor of the second, third, or fourth embodiment. Although the motor 1 is used as a driving source of the outdoor fan 510 and also as a driving source of the indoor fan 520 in this example, it is sufficient that the motor 1 is used as at least one of the driving sources.

The motor 1 described in each embodiment can also be mounted on any electric apparatuses other than the fan of the air conditioner.

Although the desirable embodiments have been specifically described above, the present disclosure is not limited to the above-described embodiments, and various modifications and changes can be made to those embodiments.

What is claimed is:

1. A motor comprising:
   a rotor;
   a stator;
   a circuit board attached to the stator;
   a heat dissipation member disposed on a side of the circuit board opposite to the stator; and
   a resin portion covering the stator, the circuit board, and at least a part of the heat dissipation member,
   wherein the heat dissipation member has a first positioning portion having a hole or a concave portion, and
   wherein the resin portion has a second positioning portion having a hole or a concave portion, at a position positioning portion in a direction of a rotation axis of the rotor.

2. The motor according to claim 1, further comprising:
   a support member disposed between the circuit board and the heat dissipation member,
   wherein the heat dissipation member is supported by the support member.

3. The motor according to claim 1, wherein the heat dissipation member is supported by the stator.

4. The motor according to claim 1, wherein the heat dissipation member has a covered portion covered with the resin portion and an exposed portion exposed from the resin portion.

5. The motor according to claim 4, wherein the exposed portion of the heat dissipation member has a fin.

6. The motor according to claim 5, wherein the covered portion of the heat dissipation member has a flange on an outer side of the fin in a radial direction about a rotation axis of the rotor.

7. The motor according to claim 1, wherein the heat dissipation member is a plate-shaped member.

8. The motor according to claim 1,
   wherein the first positioning portion is formed at an outer end of the heat dissipation member in a radial direction about a rotation axis of the rotor.

9. The motor according to claim 1, wherein the first positioning portion is one of a plurality of first positioning portions provided at equal intervals in a circumferential direction about the rotation axis, and
   wherein the second positioning portion is one of a plurality of second positioning portions provided at equal intervals in the circumferential direction about the rotation axis.

10. The motor according to claim 1, wherein at least one of the first positioning portion and the second positioning portion has a circular shape.

11. The motor according to claim 1, wherein the first positioning portion is formed in an exposed portion of the heat dissipation member, the exposed portion being exposed from the resin portion, and the first positioning portion has a surface parallel to the rotation axis.

12. The motor according to claim 1, wherein the resin portion has an attachment leg, and
   wherein the second positioning portion is formed in the attachment leg.

13. The motor according to claim 1, wherein a heat dissipation sheet is provided between the heat dissipation member and the circuit board.

14. The motor according to claim 13, wherein the heat dissipation sheet is supported by the resin portion.

15. The motor according to claim 13, wherein the circuit board has a first surface facing the stator and a second surface opposite to the first surface, an element being provided on the first surface, the second surface being in contact with the heat dissipation sheet, and wherein the circuit board has a heat conductive member that passes through the circuit board and is in contact with both of the element and the heat dissipation sheet.

16. The motor according to claim 1, wherein the rotor comprises a rotor core and a permanent magnet attached to the rotor core, and wherein the permanent magnet constitutes a magnet magnetic pole, and a part of the rotor core constitutes a virtual magnetic pole.

17. A fan comprising:

the motor according to claim 1, and a blade driven to rotate by the motor.

18. An air conditioner comprising:

an outdoor unit; and an indoor unit connected with the outdoor unit via a refrigerant pipe, wherein at least one of the outdoor unit and the indoor unit has the fan according to claim 17.

19. A manufacturing method of a motor, comprising the steps of:

assembling a stator;

integrally molding the stator, a circuit board, and a heat dissipation member with resin; and mounting a rotor inside the stator, wherein the heat dissipation member has a positioning portion with a hole or a concave portion, and wherein the step of integrally molding the stator, the circuit board, and the heat dissipation member using the resin comprises engaging the hole or concave portion of the heat dissipation member with a positioning member provided in a mold.

* * * * *